(12) United States Patent
Srivatsan et al.

(10) Patent No.: US 11,772,648 B2
(45) Date of Patent: Oct. 3, 2023

(54) LANE KEEP ASSISTANCE BASED ON RATE OF DEPARTURE

(71) Applicant: R.H. Sheppard Co. Inc., Hanover, PA (US)

(72) Inventors: Srimathi Srivatsan, Bloomfield Hills, MI (US); Apurva Jamaiyar, Troy, MI (US)

(73) Assignee: R.H. Sheppard Co. Inc., Hanover, PA (US)

( * ) Notice: Subject to any disclaimer, the term of this patent is extended or adjusted under 35 U.S.C. 154(b) by 328 days.

(21) Appl. No.: 17/186,160

(22) Filed: Feb. 26, 2021

(65) Prior Publication Data

US 2022/0274596 A1 Sep. 1, 2022

(51) Int. Cl.
| | |
|---|---|
| *B60W 30/12* | (2020.01) |
| *B60R 16/023* | (2006.01) |
| *B60W 10/18* | (2012.01) |
| *B60W 10/20* | (2006.01) |
| *B60W 30/04* | (2006.01) |
| *B62D 15/02* | (2006.01) |
| *B60Q 1/34* | (2006.01) |

(52) U.S. Cl.
CPC ......... *B60W 30/12* (2013.01); *B60R 16/0231* (2013.01); *B60W 10/18* (2013.01); *B60W 10/20* (2013.01); *B60W 30/04* (2013.01); *B62D 15/025* (2013.01); *B60Q 1/346* (2013.01); *B60W 2552/53* (2020.02); *B60W 2710/18* (2013.01); *B60W 2710/20* (2013.01)

(58) Field of Classification Search
None
See application file for complete search history.

(56) References Cited

U.S. PATENT DOCUMENTS

| | | |
|---|---|---|
| 5,445,240 A | 8/1995 | Cunningham et al. |
| 5,454,439 A | 10/1995 | Birsching |
| 5,749,432 A | 5/1998 | Birsching |

(Continued)

FOREIGN PATENT DOCUMENTS

| | | | |
|---|---|---|---|
| EP | 0806336 A2 | * | 5/1997 |
| EP | 3309044 A1 | | 4/2018 |

(Continued)

OTHER PUBLICATIONS

English (machine) translation of KR 10-2012-0136492 A.

(Continued)

*Primary Examiner* — Peter D Nolan
*Assistant Examiner* — Michael F Whalen
(74) *Attorney, Agent, or Firm* — Reising Ethington P.C.

(57) ABSTRACT

A lane keep assist system for a vehicle includes a controller that receives first and second signals including values for a distance from a point on the vehicle to an edge of a lane marker for the vehicle's lane of travel at first and second times. The controller determines a rate of change in the distance responsive to the first and second signals and generates a power steering system control signal responsive to the rate of change. The control signal generates a force on a steering gear of the vehicle connected to one or more steerable wheels on the vehicle to control the position of the vehicle relative to the lane of travel with the amount of the force responsive to the rate of change.

17 Claims, 2 Drawing Sheets

(56) References Cited

U.S. PATENT DOCUMENTS

| | | | |
|---|---|---|---|
| 5,842,536 | A | 12/1998 | Birsching |
| 7,264,080 | B2 | 9/2007 | Birsching et al. |
| 7,364,006 | B2 | 4/2008 | Birsching et al. |
| 7,434,654 | B2 | 10/2008 | Birsching et al. |
| 7,898,139 | B2 | 3/2011 | Islam et al. |
| 8,013,696 | B2 | 9/2011 | Khetan et al. |
| 8,365,628 | B2 | 2/2013 | Islam et al. |
| 8,428,821 | B2 | 4/2013 | Nilsson |
| 8,589,031 | B2 | 11/2013 | Birsching et al. |
| 9,079,608 | B2 | 7/2015 | Birsching |
| 9,346,489 | B2 | 5/2016 | Dutsky et al. |
| 9,415,802 | B2 | 8/2016 | Dutsky et al. |
| 9,471,067 | B2 | 10/2016 | Birsching |
| 9,522,700 | B2 | 12/2016 | Yamaoka |
| 9,545,948 | B2 | 1/2017 | Dutsky et al. |
| 9,852,633 | B2 | 12/2017 | Igarashi et al. |
| 2008/0189012 | A1 | 8/2008 | Kaufmann |
| 2011/0015850 | A1* | 1/2011 | Tange ............ B60T 8/17557 701/116 |
| 2018/0273051 | A1 | 9/2018 | Amato et al. |
| 2018/0354555 | A1* | 12/2018 | Sheng ............ B62D 15/0255 |
| 2020/0298852 | A1* | 9/2020 | Tanaka ............ B60W 40/08 |
| 2022/0297756 | A1* | 9/2022 | Caldwell ............ B62D 15/029 |
| 2023/0037472 | A1* | 2/2023 | Caldwell ............ G06V 20/588 |

FOREIGN PATENT DOCUMENTS

| | | |
|---|---|---|
| JP | H09-301206 A | 11/1997 |
| KR | 10-2012-0136492 A | 12/2012 |
| WO | 2011/101212 A1 | 8/2011 |

OTHER PUBLICATIONS

English (machine) translation of WO 2011/101212 A1.
Bendix Commercial Vehicle Systems LLC, Service Data Sheet SD-64-4976 AutoVue Lane Departure Warning (LDW) System by Bendix CVS (2016).
United Nations, Agreement Concerning the Adoption of Harmonized Technical United Nations Regulations for Wheeled Vehicles, Equipment and Parts Which Can Be Fitted and/or Used on Wheeled Vehicles and the Conditions for Reciprocal Recognition of Approvals Granted on the Basis of These United Nations Regulations (Rev. 3, Nov. 7, 2018).
International Organization for Standarization (ISO), International Standard ISO 11270 Intelligent Transport Systems—Lane Keeping Assistance Systems (LKAS)—Performance Requirements and Test Procedures, table of contents and pp. 1-4 (May 15, 2014).
International Search Report issued in corresponding International (PCT) Application No. PCT/US2022/014868 (dated May 11, 2022).
Written Opinion issued in corresponding International (PCT) Application No. PCT/US2022/014868 (dated May 11, 2022).

* cited by examiner

LANE KEEP ASSISTANCE BASED ON RATE OF DEPARTURE

BACKGROUND OF THE INVENTION a. Field of the Invention

This disclosure relates to a system and method for providing assistance to keep a vehicle within a lane of travel. In particular, this disclosure relates to a system and method that control the amount of assistance responsive to the rate of change in the distance between the vehicle and a lane marker on one side of the lane of travel.

b. Background Art

Conventional vehicles include power steering systems that assist the vehicle operator in steering the vehicle by augmenting the force applied by the operator when turning the steering wheel. Modern vehicles also frequently include a lane keep assist system that uses elements of the same power steering system to provide assistance to the vehicle operator to maintain a position of the vehicle relative to a lane of travel. For example, the system may provide resistance to the force applied by the operator in circumstances where the vehicle is drifting out of the lane of travel or making an unintentional lane change due to, for example, operator error, drowsiness or distractions.

Lane keep assist systems provide a significant safety benefit to vehicle operators and also to the operators of surrounding vehicles, pedestrians, and roadworkers. Lane keep assist systems also help to protect road infrastructure. Conventional lane keep assist systems, however, are often complex and reliant on hardware in the vehicle and/or communication protocols that are proprietary or otherwise vehicle specific. As a result, the systems cannot be easily adapted for use across different vehicles.

The inventor herein has recognized a need for a system and method for providing assistance to keep a vehicle within a lane of travel that will minimize and/or eliminate one or more of the above-identified deficiencies.

BRIEF SUMMARY OF THE INVENTION

This disclosure relates to a system and method for providing assistance to keep a vehicle within a lane of travel. In particular, this disclosure relates to a system and method that control the amount of assistance responsive to the rate of change in the distance between the vehicle and a lane marker on one side of the lane of travel One embodiment of a lane keep assist system for a vehicle a lane keep assist controller configured to receive a first signal including a value for a distance from a point on the vehicle to an edge of a lane marker on a side of a lane of travel for the vehicle at a first time and to receive a second signal including a value for the distance from the point on the vehicle to the edge of the lane marker at a second time after the first time. The controller is further configured to determine a rate of change in the distance from the point on the vehicle to the edge of the lane marker responsive to the first signal and the second signal. The lane keep assist controller is further configured to generate a power steering system control signal responsive to the rate of change. The power steering system control signal is configured to generate a force on a steering gear of the vehicle connected to one or more steerable wheels on the vehicle to control the position of the vehicle relative to the lane of travel. The amount of the force is responsive to the rate of change.

One embodiment of a method for providing assistance to keep a vehicle within a lane of travel includes the step of receiving a first signal including a value for a distance from a point on the vehicle to an edge of a lane marker on a side of a lane of travel for the vehicle at a first time. The method further includes the step of receiving a second signal including a value for the distance from the point on the vehicle to the edge of the lane marker at a second time after the first time. The method further includes the step of determining a rate of change in the distance from the point on the vehicle to the edge of the lane marker responsive to the first signal and the second signal. The method further includes the step of generating a power steering system control signal responsive to the rate of change. The power steering system control signal is configured to generate a force on a steering gear of the vehicle connected to one or more steerable wheels on the vehicle to control the position of the vehicle relative to the lane of travel. The amount of the force is responsive to the rate of change.

One embodiment of an article of manufacture includes a non-transitory computer storage medium having a computer program encoded thereon that when executed by a controller provides assistance to keep a vehicle within a lane of travel. The computer program includes code for determining a rate of change in a distance from a point on the vehicle to an edge of a lane marker on a side of a lane of travel for the vehicle responsive to a first signal including a value for the distance from the point on the vehicle to the edge of the lane marker at a first time and a second signal including a value for the distance from the point on the vehicle to the edge of the lane marker at a second time after the first time. The program further includes code for generating a power steering system control signal responsive to the rate of change. The power steering system control signal is configured to generate a force on a steering gear of the vehicle connected to one or more steerable wheels on the vehicle to control the position of the vehicle relative to the lane of travel. The amount of the force is responsive to the rate of change.

A system and method for providing assistance to keep a vehicle within a lane of travel in accordance with the present teachings are advantageous relative to conventional systems and methods. The disclosed system and method provide assistance to the vehicle operator to maintain the position of the vehicle in a lane of travel that is reliable and accounts for dynamic vehicle behavior. The system and method accomplish this function while being less complex than conventional systems and methods and without reliance on hardware and/or communication protocols that are proprietary or otherwise vehicle specific. As a result, the system and method can be easily adapted for use across different vehicles.

The foregoing and other aspects, features, details, utilities, and advantages of the disclosed system and method will be apparent from reading the following description and claims, and from reviewing the accompanying drawings.

DETAILED DESCRIPTION OF THE INVENTION

Figure 1:
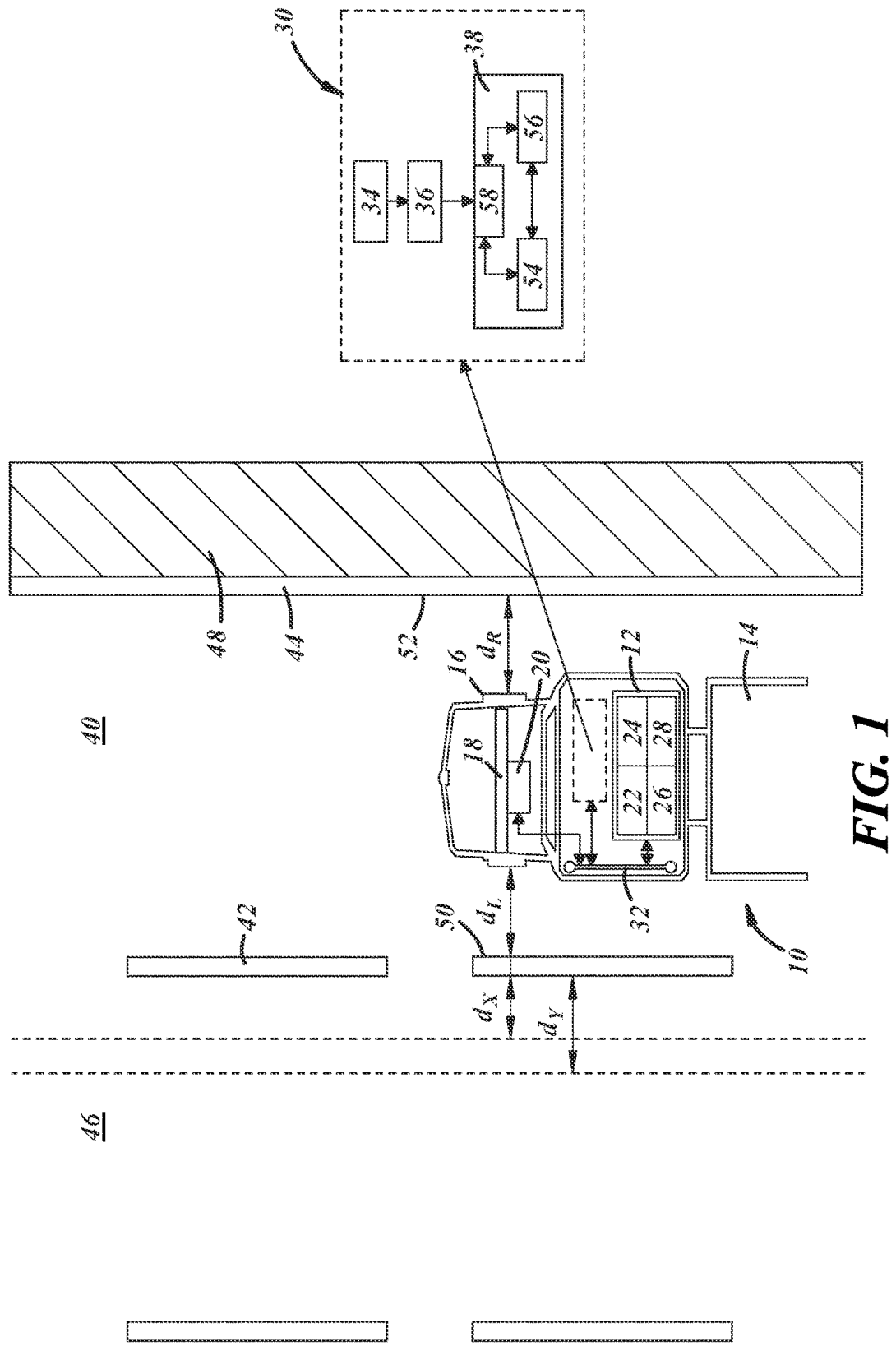
FIG. 1 is a diagrammatic view of a vehicle incorporating one embodiment of a lane keep assist system in accordance with the present teachings.

Referring now to the drawings wherein like reference numerals are used to identify identical components in the various views, FIG. 1 illustrates a vehicle 10 incorporating a lane keep assist system in accordance with the present teachings. In the illustrated embodiment, vehicle 10 comprises a commercial vehicle and, in particular, a tractor-trailer having a tractor 12 or power unit and one of more trailers 14 or towed units. It should be understood, however, that the lane keep assist system described herein may find application in a wide variety of other commercial vehicles (e.g. buses) and non-commercial vehicles (e.g., automobiles). Vehicle 10 includes one or more steerable wheels 16, a steering linkage 18, and a power steering system 20. Vehicle 10 may further include a variety of required or optional safety systems including, but not limited to, a turn signal system 22, an emergency braking system 24, a stability control system 26, and a rollover prevention system 28. Vehicle 10 further includes a lane keep assist system 30 in accordance with the present teachings. Systems 20, 22, 24, 26, 28, and 30 may be interconnected by, and communicate through, a conventional vehicle communications bus 32 and, in particular, a controller area network (CAN). In accordance with one aspect of the present teachings, bus 32 is configured to transmit data in accordance with the Society of Automotive Engineers J1939 transmission protocol.

Wheels 16 are provided to support and propel vehicle 10 along a road surface. In the illustrated embodiment, wheels 16 are steerable wheels on either side of the vehicle and together form part of a steer axle. It should be understood that vehicle 10 will also include one or more driven wheels (not shown) on either side of the vehicle that together form part of a drive axle and that are driven by a power unit (e.g., an internal combustion engine) on vehicle 10. Vehicle 10 may further include on more sets of non-driven, non-steered wheels (not shown) on either side of the vehicle (e.g., as part of a trailer axle on trailer 14).

Steering linkage 18 connects wheels 16 to the steering mechanism for vehicle 10 and, in particular, to a steering gear in power steering system 20 that transfers the vehicle operator's steering input (through, e.g., a steering wheel and steering column (not shown)) to linkage 18 and, ultimately to wheels 16. Linkage 18 includes a combination of rods and levers that are moved laterally by the steering gear to turn wheels 16. Linkage 18 may, for example include steering knuckles, tie rods, links, an idler arm and a Pittman arm that is driven by the steering gear.

Power steering system 20 is provided to transfer and augment forces input by the vehicle operator (through, e.g., a steering wheel (not shown)) to steering linkage 18 in order to turn wheels 16. In accordance with the present teachings, system 20 is also provided to assist the vehicle operator in maintaining the position of vehicle 10 relative to a lane of travel in response to signals generated by lane keep assist system 30. System 20 includes a steering gear that transfers steering inputs by the vehicle operator to steering linkage 18. The steering gear may comprise, rack and pinion gears or a recirculating ball gear. System 20 may further include an electric motor and a motor controller that receives input signals from steer angle and torque sensors on the steering column and generates output signals to control the motor to assist movement of the steering column or components of the steering gear. The motor controller may also receive input signals from other vehicle systems including, in accordance with the present teachings, lane keep assist system 30.

Turn signal system 22 is provided to generate an indication of the vehicle operator's intent to make a turn or to change lanes on a multi-lane road. System 22 includes an operator interface (not shown) such as a lever through which the vehicle operator inputs an intent to turn or change lanes. System 22 also includes one more indicators (not shown) on the exterior of the vehicle (e.g., a visual indicator such as a blinking light) that may be activated in response to the operator's input to advise other vehicle operators and pedestrians of the vehicle operator's intent and on the interior of the vehicle (e.g., a visual indicator such as a blinking light or audible indicator such as a repeating noise) to advise the vehicle operator that the operator's input has been recognized.

Emergency braking system 24 activates wheel brakes (not shown) on vehicle 10 in response to predetermined conditions (e.g., an impending collision with another vehicle, pedestrian or road infrastructure). System 24 may include sensors configured to sense a variety of conditions external to the vehicle (e.g., the presence of and/or distance to other vehicles, pedestrians or road infrastructure, environmental conditions, etc.) and internal to the vehicle (e.g., operator incapacitation). The sensors may include cameras, RADAR or LIDAR systems, moisture sensors or other forms of sensors. System 24 may further include a controller configured to receive signals generated by the sensors and to generate control signals for controlling components of the vehicle's braking system (e.g., fluid control valves) to adjust vehicle braking.

Stability control system 26 is provided to maintain a direction of travel for vehicle 10 that is consistent with the direction intended by the operator as indicated by the operator's steering input. System 26 may include sensors configured to sense a variety of conditions including a yaw rate sensor, wheel speed sensors and a steer angle sensor. System 26 may further include a controller configured to receive signals generated by the sensors and to generate control signals for controlling components of the vehicle's braking system (e.g., fluid control valves) to adjust vehicle braking and/or components of the vehicle's power system (e.g., air and fluid intake for an internal combustion engine) to reposition vehicle 10 so that the actual direction of travel matches the intended direction of travel. In particular, system 26 may continuously compare the intended direction of vehicle 10 as determined by signals from a steering angle sensor with the actual direction of vehicle 10 as determined through a yaw rate sensor that measures the angular velocity of vehicle 10 about its vertical (yaw) axis. When the intended and actual directions of vehicle 10 diverge, the controller generates control signals for one or both of the vehicle engine and the wheel brakes in order to control the torque at one or more of the wheels on vehicle 10 so that the actual direction of vehicle 10 will match the intended direction.

Rollover prevention system 28 is provided to inhibit rollover of vehicle 10. System 28 may again include sensors configured to sense a variety of conditions including a yaw angle sensor, steer angle sensor, and/or an inertial measurement unit (IMU). System 28 may further include a controller configured to receive signals generated by the sensors and to generate control signals for controlling components of the vehicle's braking system (e.g., fluid control valves), components of the vehicle's power system (e.g., air and fluid intake for an internal combustion engine) and/or components of the vehicle's suspension system to counter forces that may result in rollover of vehicle 10.

Lane keep assist system 30 provides assistance to keep a vehicle within a lane of travel. In accordance with the present teachings, system 30 determines the rate of change in a distance between a point on a vehicle (such as an outer edge of a wheel 16 or tire on wheel 16) and a lane marker (also known as the "rate of departure") on a lane of travel and adjusts the level of assistance provided to the vehicle operator responsive to the rate of change (e.g., by increasing the amount of assistance as the rate of change increases). In this manner, system 30 can provides assistance to the vehicle operator to maintain the position of the vehicle in a lane of travel that is reliable and accounts for dynamic vehicle behavior while doing so using pre-existing hardware and communication protocols so that the system can be adapted for use with a wide variety of vehicles. System 30 may include one or more cameras 34, a camera controller 36, and a lane keep assist controller 38.

Camera 34 is configured to capture images of a lane of travel 40 for vehicle 10. The images include lane markers 42, 44 on either side of the lane of travel 40. In the illustrated embodiment, the lane of travel 40 for vehicle 10 is the rightmost lane on a road having multiple lanes traveling in the same direction. Therefore, lane marker 42 is a broken lane marker marking the border between the lane of travel 40 for vehicle 10 and an adjacent lane of travel 46. Lane marker 44 is an unbroken or continuous lane marker marking the border between the lane of travel 40 and an off-road area 48. Camera 34 may comprise a digital camera and may be mounted on the vehicle's windshield. The camera may, for example, comprise the camera forming part of the AutoVue® Lane Departure Warning System offered for sale by Bendix Commercial Vehicle Systems LLC. One advantage of the disclosed system and method is that a reliable and dynamic lane keep assist system 30 can be implemented using only camera 34 without any additional sensors.

Camera controller 36 is configured to process images generated by camera 34 and to generate, responsive to the images, signals including information obtained from the images. In accordance with the present teachings, the signals include values for distances $d_L$ and $d_R$ from points on either side of vehicle 10 (e.g., the outside of wheels 16) to the inboard edge 50, 52, respectively of lane markers 42, 44 on either side of vehicle 10. The signals may include the Left Wheel Departure Distance signal (J1939 SPN8139) and Right Wheel Lane Departure Distance signal (J1939 SPN 8140). Controller 36 may comprise a programmable microprocessor or microcontroller or may comprise an application specific integrated circuit (ASIC). Controller 36 may include a central processing unit (CPU), a memory, and an input/output (I/O) interface through which controller 36 may receive a plurality of input signals and transmit a plurality of output signals over bus 32. The input signals may include image information from camera 34. The output signals may include information obtained from the images captured by camera 34 as set forth above. Controller 36 may, for example, comprise the lane departure warning processor forming part of the AutoVue® Lane Departure Warning System offered for sale by Bendix Commercial Vehicle Systems LLC.

Lane keep assist controller 38 is configured to generate, responsive to signals received from camera controller 36, control signals for power steering system 20 in order to generate, as needed, a force on a steering gear in power steering system 20 and, ultimately, steering linkage 18 to control the position of vehicle 10 relative to lane of travel 40. Controller 38 may comprise a programmable microprocessor or microcontroller or may comprise an application specific integrated circuit (ASIC). Referring to FIG. 1, in the illustrated embodiment, controller 38 may include a central processing unit (CPU) 54, a memory 56, and an input/output (I/O) interface 58 through which controller 38 may receive a plurality of input signals and transmit a plurality of output signals over bus 32. The input signals may include signals received from turn signal system 22, emergency braking system 24, stability control system 26 and rollover protection system 28 in addition to signals from camera controller 36. The output signals include control signals for power steering system 20, but may also include signals used to generate information and/or warnings for the vehicle operator. In the illustrated embodiment, camera controller 36 and lane keep assist controller 38 are separate controllers. It should be understood, however, that the functionality of controllers 36, 38 could be combined in a single controller.

Figure 2:
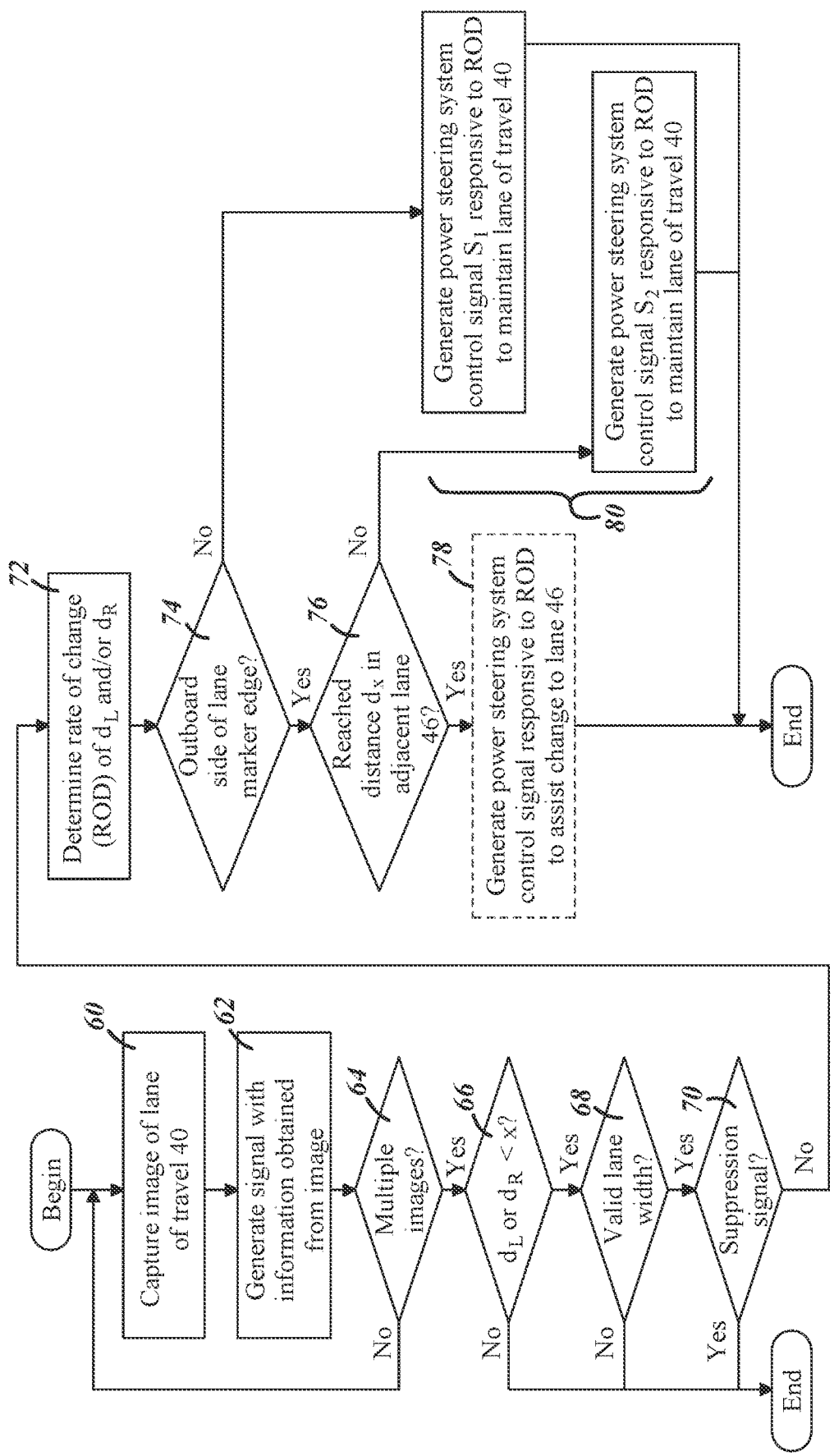
FIG. 2 is a flow-chart diagram of one embodiment of a method for providing assistance to keep a vehicle within a lane of travel in accordance with the present teachings.

In accordance with the present teachings, controller 38 may be configured with appropriate programming instructions (i.e., software or a computer program) to implement a method for providing assistance to keep vehicle 10 within lane of travel 40 as described hereinbelow. Some or all of the programming instructions may be encoded on a non-transitory computer storage medium such as memory 56 and executed by the controller 38. Referring now to FIG. 2, one embodiment of a method for providing assistance to keep vehicle 10 within lane of travel 40 may begin with the step 60 of capturing an image with a camera 34 of the lane of travel 40 for vehicle 10 at a time $t_1$. The field of view for the camera should be wide enough that the image captures the lane markers 42, 44 on either side of the lane of travel 40.

The method may continue with the step 62 of generating, responsive to the image taken at time $t_1$, one or more signals containing information obtained from the image. The signals will include values for distances from points on either side of vehicle 10, such as the outside edge of wheels 16 or a tire on wheels 16, to the edges 50, 52 of corresponding lane markers 40, 42 at time $t_1$. Referring to FIG. 1, the signals may include a value for the distance $d_L$ from the outside edge of a wheel 16 on the left side of vehicle 10 to the inboard edge 50 of lane marker 40 at time $t_1$ and a value for the distance $d_R$ from the outside edge of a wheel 16 on the right side of vehicle 10 to the inboard edge 52 of lane marker 42 at time $t_1$.

The method may continue with the step 64 of determining if more than one image has been captured by camera 34 and processed by controller 36. If only a single image has been captured and processed, the method repeats steps 60 and 62 such that camera 34 captures another image of the lane of travel 40 at a time $t_2$ after time $t_1$ and camera controller 36 generates, responsive to the image taken at time $t_2$, one or more signals containing information from the image including values for the distances $d_L$ and $d_R$ at time $t_2$. Once multiple images have been captured by camera 34 and processed by controller 36, the method proceeds to step 66.

In step 66, lane keep assist controller may determine whether the distance $d_L$ or $d_R$ from the predetermined point on vehicle 10 to the corresponding edge 50, 52 of lane marker 42, 44 at time $t_2$ meets a predetermined condition relative to a predetermined distance (e.g., is less than a predetermined distance). If vehicle 10 is laterally centered within lane of travel 40 at time $t_2$ or relatively close to the center of lane of travel 40 (such that the vehicle is more than the predetermined distance from each lane marker 42, 44), system 30 may determine that no assistance is required and the method may terminate. If the distance $d_L$ or $d_R$ indicates that vehicle 10 is relatively close to one of lane markers 42, 44, the method may proceed to step 68.

In step 68, lane keep assist controller 38, after receiving the signals from camera controller 36, determines a width of lane of travel 40 responsive to at least one of the signals. The width determination is used to determine whether vehicle 10 is in a proper lane of travel for use of the lane keep assistance functionality as opposed to, for example, being in off road area 48. Controller 38 may determine the width of the lane of travel using the distances $d_L$ and $d_R$ and other information, such as the width of vehicle 10, that may be stored in memory 56. Controller 38 then determines whether the width of the lane of travel meets a predetermined condition relative to a predetermined lane width. The predetermined condition may, for example, be that the width of the lane of travel has a value less than the predetermined lane width. If controller 38 determines that the width of the lane of travel has a null value (cannot be determined) or is greater than the predetermined lane width, the method may terminate thereby preventing generation of a power steering control signal for power steering system 20. It should be understood that the predetermined condition described above is exemplary only. In other embodiments, the predetermined condition may be that the lane width of lane of travel 40 exceed a predetermined lane width or that the lane width of lane of travel 40 be within a certain range on one or both sides of the predetermined lane width. It should also be understood that controller 38 may require that the determined lane width for lane of travel 40 meet predetermined conditions with respect to multiple predetermined lane widths (e.g., being less than a maximum predetermined lane width and greater than a minimum predetermined lane width).

If controller 38 determines that the width of the lane of travel 40 meets the predetermined condition(s) relative to the predetermined lane width(s), the method may continue with the step 70 in which controller 38 determines whether there are any operating conditions present for vehicle 10 under which lane keep assistance system 30 should not be active. Controller 38 may be configured to receive suppression signals from a variety of systems in vehicle 10 indicative of the presence or absence of a vehicle operating condition under which lane keep assistance system 30 should not be active. For example, controller 38 may be configured to receive a suppression signal from turn signal system 22 indicating whether or not a turn signal indicator has been activated. Because activation of the turn signal indicator may indicate an intent of the vehicle operator to move out of the lane of travel 40 (e.g., to adjacent lane of travel 42), lane keep assist system 30 should not generate power steering system control signals intended to keep vehicle 10 in the lane of travel 40. The suppression signal from turn signal system 22 may, for example, comprise the operator's external light control signal including the Turn Signal Switch code (J1939 SPN 2876) which indicates the position of the operator's turn signal switch. Controller 38 may also be configured to receive suppression signals from any or all of emergency braking system 24, stability control system 26, and a rollover prevention system 28 indicating whether the corresponding system has been activated. Because systems 24, 26, 28 are activated in response to the detection of an unsafe condition (e.g., an impending collision or loss of control of the vehicle 10) and assume at least partial control of vehicle systems such as the braking, steering, power and/or suspension systems to alleviate the unsafe condition, lane keep assist system 30 should remain inactive when any of systems 24, 26, 28 are active to prevent generation of power steering system control signals that might counter the actions of systems 24, 26, 28. The suppression signal from emergency braking systems 24 may, for example, include the Forward Collision Advanced Emergency Braking System Stage code (J1939 SPN 5676) indicative of the operational stage of a forward collision advanced emergency braking system. The suppression signal from rollover prevention system 28 may, for example, include the ROP Engine Control code (J1939 SPN 1816) indicative of whether system 28 has attempted to assert control of the engine in vehicle 10. Although systems 22, 24, 26, 28 have been discussed specifically herein, it should be understood that suppression signals may be derived from other vehicle systems where contemporaneous operation of the system and lane keep assistance system 30 would may cause unintended or undesirable results. If controller 38 receives a suppression signal from any of systems 22, 24, 26, 28 indicating the presence of the predetermined operating condition, the method may again terminate thereby preventing generation of a power steering control signal for power steering system 20.

If controller 38 has not received a suppression signal from any of systems 22, 24, 26, 28 indicating the presence of an operating condition under which lane keep assist system 30 should be inactive, the method may continue with the step 72 of determining a rate of change in the distance $d_L$ and/or $d_R$ from the corresponding point on the vehicle to the edge 50, 52 of the corresponding lane marker 42, 44 (also known as the "rate of departure" or ROD) responsive to the signals received from camera controller 36. Controller 38 may determine the rate of the change in the distance (or rate of departure) on either side of vehicle 10 by determining the difference Δd between the values for $d_L$ obtained from each of the images (and/or the values for $d_R$ obtained from each of the images), determining the difference Δt between times $t_1$ and $t_2$, and dividing Δd by Δt. It should be understood that the rate of change in the distance $d_L$ ($ROD_L$) and the rate of change in the distance $d_R$ ($ROD_R$) are inversely related (i.e., when one value increases, the other decreases). It should also be understood that the method illustrated in FIG. 2 and described herein illustrates one embodiment of the invention and that, for example, step 72 may be performed prior to steps 66, 68, and 70 in other embodiments.

In accordance with the present teachings, controller 38 ultimately uses the rate of change in the distance $d_L$ and/or $d_R$ (i.e., $ROD_L$ and/or $ROD_R$) to generate a power steering system control signal for power steering system 20 that is configured to generate a force on a steering gear in system 20 and ultimately on steering linkage 18 in order to control the position of vehicle 10 relative to the lane of travel 40 with the amount of the force responsive to the rate of change (see step 80 discussed below). Prior to generating the power steering system control signal, however, controller 38 may, in various embodiments, be configured to perform several additional actions that impact whether the power steering system control signal is generated and/or the configuration of that signal.

In step 74, controller 38 determines, responsive to the signal generated by camera controller 36 from the image taken at time $t_2$, whether the point on vehicle 10 from which distance $d_L$ or $d_R$ is being measured (e.g., the outer edge of a wheel 16 or tire on wheel 16) is disposed on an inboard side or an outboard side of the corresponding edge 50, 52 of lane marker 42, 44. Controller 38 determines whether this point on the vehicle is on the inboard or outboard side of edge 50 or 52 of the corresponding lane marker 42 or 44, based on whether the measured distance $d_L$ or $d_R$ and/or the corresponding rate of departure $ROD_L$ or $ROD_R$ is positive or negative because the sign for the value will change as the point on vehicle 10 crosses the edge 50 or 52 of the lane marker 42 or 44. In particular, the sign for $d_L$ and $ROD_L$ will change from negative to positive whenever the identified point on the left side of vehicle 10 crosses edge 50 of lane marker 42 while the sign for $d_R$ and $ROD_R$ will change from positive to negative whenever the identified point on the right side of vehicle 10 crosses edge 52 of lane marker 44. If controller 38 determines that the point on vehicle 10 is disposed on an outboard side of edge 50 or 52, controller may be configured to modify the power steering control signal as discussed below to increase the force relative to the force that would be generated if the point on vehicle 10 is disposed on an inboard side of the edge 50 or 52. In particular, an outboard location of the point on vehicle 10 relative to edge 50 or 52 is indicative of vehicle 10 beginning to leave the lane of travel 40 and to drift into adjacent lane of travel 46. This circumstance may indicate that a stronger level of assistance is required to urge vehicle 10 to return to its predetermined position relative to the lane of travel 40. In this circumstance, controller 38 may be configured to generate a power steering control signal that will result in an increased force on the steering gear in power steering system 20 relative to forces that are generated when the same point on vehicle 10 is disposed on an inboard side of edge 50 or 52.

In step 76, controller 38 may further determine, responsive to the signal generated by camera controller 36 from the image taken at time $t_2$, whether the point on vehicle 10 has reached a predetermined distance $d_x$ from the edge 50 or 52 of the corresponding lane marker 42 or 44 on the outboard side of the lane marker 42 or 44. Once vehicle 10 has moved a certain distance into adjacent lane of travel 46, system 30 may be configured to interpret the position of vehicle 10 as an intentional change in the lane of travel (even without activation of a turn signal indicator by system 22). Under this interpretation, providing assistance to maintain vehicle 10 within lane of travel 40 would be inappropriate. Therefore, the method may again terminate thereby preventing generation of a power steering control signal for power steering system 20. In an alternative embodiment (represented in the dashed line box in FIG. 2), the method may continue with a step 78 of generating of a power steering control signal that will apply a force to steering linkage 18, but with the force assisting movement of vehicle 10 into the adjacent lane of travel 46 instead of assisting a return to a predetermined lateral position within lane of travel 40. In yet another alternative embodiment, generation of the power steering system control signal that assists movement of vehicle 10 into the adjacent lane of travel 46 does not occur unless the point on vehicle 10 has reached a predetermined distance $d_y$, greater than $d_x$, from the edge 50 or 52 of the corresponding lane marker 42 or 44 on the outboard side of the lane marker 42 or 44.

As long as the distance $d_L$ or $d_R$ indicates that vehicle 10 remains in the lane of travel 40 or has not moved into the adjacent lane of travel 46 beyond a predetermined distance $d_x$, the method may continue with the step 80 of generating one or more power steering system control signals $S_1$ or $S_2$ responsive to the rate of change $ROD_L$ or $ROD_R$. Controller 38 generates power steering system control signals for system 20 that are configured to apply a force to a steering gear in system 20 which is then applied to steering linkage 18 in order to steer wheels 16 and control the position of vehicle 10 relative to the lane of travel 40. In accordance with the present teachings, the amount of the force is responsive to the rate of change $ROD_L$ or $ROD_R$. In particular, as the rate of change $ROD_L$ or $ROD_R$ increases, the control signal $S_1$ or $S_2$ generated by controller 38 cause power steering system 20 to apply a greater force on steering linkage 18. In this manner, system 30 provides assistance to the vehicle operator to maintain the position of vehicle 10 in lane of travel 40 that is reliable and accounts for dynamic vehicle behavior and does so using pre-existing hardware (i.e. camera 34) and communication protocols (i.e. SAE J1939) so that the system 30 can be adapted for use with a wide variety of vehicles. The relationship between the increasing rate of change $ROD_L$ or $ROD_R$ and the increasing force applied to steering linkage 18 may be linear or logarithmic. As discussed above, in certain embodiments, controller 38 may determine whether vehicle 10 has begun moving into adjacent lane of travel 46 by determining whether the point on vehicle 10 from which distance $d_L$ or $d_R$ is being measured is disposed on an inboard side or an outboard side of the corresponding edge 50, 52 of lane marker 42, 44. In some embodiments, controller 38 may be configured to generate power steering system control signals $S_2$ that result in an increased force on the steering gear in power system 20—relative to the force that would be generated from a power steering system control signal $S_1$ based on the rate of departure $ROD_L$ or $ROD_R$ alone—once controller 38 determines that the point on vehicle 10 is disposed on an outboard side of the edge 50 or 52. The power steering system control signals $S_2$ generated by controller 38 in this circumstance may increase the force by a predetermined amount relative to the force based on the rate of departure $ROD_L$ or $ROD_R$ alone, may apply a multiplier, constant or weight to the force based on the rate of departure $ROD_L$ or $ROD_R$ alone or may employ another formula to increase the force.

A system 30 and method for providing assistance to keep a vehicle 10 within a lane of travel 40 in accordance with the present teachings are advantageous relative to conventional systems and methods. The disclosed system 30 and method provide assistance to the vehicle operator to maintain the position of the vehicle 10 in a lane of travel 40 that is reliable and accounts for dynamic vehicle behavior. The system 30 and method accomplish this function while being less complex than conventional systems and methods and without reliance on hardware and/or communication protocols that are proprietary or otherwise vehicle specific. As a result, the system 30 and method can be easily adapted for use across different vehicles.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. A lane keep assist system for a vehicle, comprising:
a lane keep assist controller configured to
receive a first signal including a value for a distance from a first point on the vehicle to an edge of a first lane marker on a first side of a lane of travel for the vehicle at a first time;
receive a second signal including a value for the distance from the first point on the vehicle to the edge of the first lane marker at a second time after the first time;
determine a rate of change in the distance from the first point on the vehicle to the edge of the first lane marker responsive to the first signal and the second signal; and, generate a first power steering system control signal responsive to the rate of change, the first power steering system control signal configured to generate a force on a steering gear of the vehicle connected to one or more steerable wheels on the vehicle to control the position of the vehicle relative to the lane of travel, the amount of the force responsive to the rate of change wherein the first signal further includes a value for a distance from a second point on the vehicle to an edge of a second lane marker on a second side of the lane of travel at the first time and the second signal further includes a value for the distance from the second point on the vehicle to the edge of the second lane marker at the second time, the lane keep assist controller further configured to determine a width of the lane of travel responsive to at least one of the first and second signals and to prevent generation of the first power steering system control signal if the width of the lane of travel meets a predetermined condition relative to a predetermined lane width.

2. The lane keep assist system of claim 1 wherein the lane keep assist controller is further configured to determine, responsive to the second signal, whether the first point on the vehicle is disposed on an inboard side of the edge of the first lane marker or an outboard side of the edge of the first lane marker and the amount of the force is set at a first value responsive to the rate of change if the first point on the vehicle is disposed on the inboard side of the first lane marker and is set at a second value, greater than the first value, responsive to the rate of change if the first point on the vehicle is disposed on the outboard side of the first lane marker.

3. The lane keep assist system of claim 2, wherein the lane keep assist controller is further configured to determine, responsive to the second signal, whether the first point on the vehicle has reached a predetermined distance from the edge of the first lane marker on the outboard side of the first lane marker and to prevent generation of the first power steering system control signal when the first point on the vehicle has reached the predetermined distance.

4. The lane keep assist system of claim 2, wherein the lane keep assist controller is further configured to determine, responsive to the second signal, whether the first point on the vehicle has reached a predetermined distance from the edge of the first lane marker on the outboard side of the first lane marker and to generate, when the first point on the vehicle has reached the predetermined distance, a second power steering system control signal, the second power steering system control signal configured to generate a force on the steering gear urging the vehicle out of the lane of travel and into an adjacent lane of travel, the amount of the force generated by the second power steering system control signal responsive to the rate of change.

5. The lane keep assist system of claim 1 wherein the lane keep assist controller is further configured to receive a suppression signal indicative of the presence or absence of a vehicle operating condition and to prevent generation of the first power steering system control signal if the suppression signal indicates the presence of the vehicle operating condition.

6. The lane keep assist system of claim 5 wherein the vehicle operating condition comprises one of activation of a vehicle turn signal indicator, activation of an emergency braking system, activation of a stability control system and activation of a roll-over prevention system.

7. The lane keep assist system of claim 1 wherein the lane keep assist controller communicates over a communications bus configured to transmit data in accordance with the Society of Automotive Engineers J1939 transmission protocol in effect on the filing date of this application.

8. A method for providing assistance to keep a vehicle within a lane of travel, comprising the steps of:
receiving a first signal including a value for a distance from a first point on the vehicle to an edge of a first lane marker on a first side of a lane of travel for the vehicle at a first time;
receiving a second signal including a value for the distance from the first point on the vehicle to the edge of the first lane marker at a second time after the first time;
determining a rate of change in the distance from the first point on the vehicle to the edge of the first lane marker responsive to the first signal and the second signal; and,
generating a first power steering system control signal responsive to the rate of change, the first power steering system control signal configured to generate a force on a steering gear of the vehicle connected to one or more steerable wheels on the vehicle to control the position of the vehicle relative to the lane of travel, the amount of the force responsive to the rate of change
wherein the first signal further includes a value for a distance from a second point on the vehicle to an edge of a second lane marker on a second side of the lane of travel at the first time and the second signal further includes a value for the distance from the second point on the vehicle to the edge of the second lane marker at the second time, and further comprising the steps of:
determining a width of the lane of travel responsive to at least one of the first and second signals and;
preventing generation of the first power steering system control signal if the width of the lane off travel meets a predetermined condition relative to a predetermined lane width.

9. The method of claim 8, further comprising the steps of determining, responsive to the second signal, whether the first point on the vehicle is disposed on an inboard side of the edge of the first lane marker or an outboard side of the edge of the first lane marker and wherein the amount of the force is set at a first value responsive to the rate of change if the first point on the vehicle is disposed on the inboard side of the first lane marker and is set at a second value, greater than the first value, responsive to the rate of change if the first point on the vehicle is disposed on the outboard side of the first lane marker.

10. The method of claim 9 further comprising the steps of:
determining, responsive to the second signal, whether the first point on the vehicle has reached a predetermined distance from the edge of the first lane marker on the outboard side of the first lane marker; and
preventing generation of the first power steering system control signal when the first point on the vehicle has reached the predetermined distance.

11. The method of claim 9, further comprising the steps of determining, responsive to the second signal, whether the first point on the vehicle has reached a predetermined distance from the edge of the first lane marker on the outboard side of the first lane marker; and
generating, when the first point on the vehicle has reached the predetermined distance, a second power steering system control signal, the second power system control signal configured to generate a force on the steering gear urging the vehicle out of the lane of travel and into an adjacent lane of travel, the amount of the force generated by the second power steering system control signal responsive to the rate of change.

12. The method of claim 8, further comprising the steps of:
receiving a suppression signal indicative of the presence or absence of a vehicle operating condition; and
preventing generation of the first power steering system control signal if the suppression signal indicates the presence of the vehicle operating condition.

13. The method of claim 12 wherein the vehicle operating condition comprises one of activation of a vehicle turn signal indicator, activation of an emergency braking system, activation of a stability control system and activation of a roll-over prevention system.

14. The method of claim 8 wherein the first and second signals and the first power steering system control signal are transmitted over a communications bus configured to transmit data in accordance with the Society of Automotive Engineers J1939 transmission protocol in effect on the filing date of this application.

15. An article of manufacture
a non-transitory computer storage medium having a computer program encoded thereon that when executed by a controller provides assistance to keep a vehicle within a lane of travel, the computer program including code for:
determining a rate of change in a distance from a first point on the vehicle to an edge of a first lane marker on a first side of a lane of travel for the vehicle responsive to a first signal including a value for the distance from the first point on the vehicle to the edge of the first lane marker at a first time and a second signal including a value for the distance from the first point on the vehicle to the edge of the first lane marker at a second time after the first time,
generating a first power steering system control signal responsive to the rate of change, the first power steering system control signal configured to generate a force on a steering gear of the vehicle connected to one or more steerable wheels on the vehicle to control the position of the vehicle relative to the lane of travel, the amount of the force responsive to the rate of change
wherein the computer program further includes code for determining, responsive to the second signal, whether the first point on the vehicle is disposed on an inboard side of the edge of the first lane marker or an outboard side of the edge of the first lane marker and wherein the amount of the force is set at a first value responsive to the rate of change if the first point on the vehicle is disposed on the inboard side of the first lane marker and is set at a second value, greater than the first value, responsive to the rate of change if the first point on the vehicle is disposed on the outboard side of the first lane marker.

16. The article of manufacture of claim 15 wherein the computer program further includes code for:
determining, responsive to the second signal, whether the first point on the vehicle has reached a predetermined distance from the edge of the first lane marker on the outboard side of the first lane marker; and
preventing generation of the first power steering system control signal when the first point on the vehicle has reached the predetermined distance.

17. The article of manufacture of claim 15 wherein the computer program further includes code for:
determining, responsive to the second signal, whether the first point on the vehicle has reached a predetermined distance from the edge of the first lane marker on the outboard side of the first lane marker; and
generating, when the first point on the vehicle has reached the predetermined distance, a second power steering system control signal, the second power steering system control signal configured to generate a force on the steering gear urging the vehicle out of the lane of travel and into an adjacent lane of travel, the amount of the force generated by the second power steering system control signal responsive to the rate of change.

\* \* \* \* \*